UNITED STATES PATENT OFFICE.

GILBERT JOHN FOWLER, OF URMSTON, NEAR MANCHESTER, ENGLAND.

PROCESS FOR OBTAINING PURE SHELLAC FROM STICK-LAC OR THE LIKE.

975,224.  Specification of Letters Patent.  Patented Nov. 8, 1910.

No Drawing.   Application filed November 19, 1908. Serial No. 463,437.

*To all whom it may concern:*

Be it known that I, GILBERT JOHN FOWLER, a subject of the King of Great Britain, residing at Broad Oak, Urmston, near Manchester, in the county of Lancaster, England, consulting chemist, have invented a certain new and useful Improved Process for Obtaining Pure Shellac from Stick-Lac or the Like, of which the following is a specification.

This invention relates to an improved process for the treatment of stick lac, or other crude material containing shellac and lac-dye in which advantage is taken of the differences exhibited by the various constituents in their solubility in appropriate solvents.

The process may be applied merely to separate the shellac from the lac-dye or to effect a further separation of the waxy matter from the shellac.

It is known that shellac can be separated by means of suitable solvents from the wax and lac-dye which accompany it in stick-lac and the by products of the shellac industry. Thus the wax is soluble in hot alcohol or acetone, but is substantially insoluble in the cold solvents so that if stick lac be extracted with one of these solvents in the cold, or if the extraction occur in the hot and the solution be allowed to cool to deposit the wax, a solution containing shellac with a very small proportion of the lac-dye is obtained. When it is attempted to recover the shellac from such a solution by distillation of the solvent, at a certain period of the operation, namely when the solvent has in greater part been expelled, the shellac becomes discolored and sets to a hard mass which cannot be removed from the still by any practicable method. It is owing to this discoloration that the best shellac has never been made by extracting stick-lac with such solvents. The product of the attempts to use the process has always been the so-called garnet-lac which is of comparatively little commercial value.

According to the present invention the aforesaid drawbacks to the process of extraction with alcohol or acetone are avoided by distilling off the larger part of the solvent and injecting steam into the shellac so as to expel the last portion of the solvent. In this manner the discoloration of the lac does not occur inasmuch as dehydration of the shellac resins cannot take place.

Example: A steam heater extractor provided with a condenser is charged with 100 kilos of stick lac or other material containing lac resin. This material is extracted with 150–200 liters of denatured alcohol at a temperature not exceeding say 20° V. After removal of the extract the residue is similarly treated with a further addition of 100–150 liters of cold alcohol till the remaining lac is extracted, leaving a residue containing wax, lac dye and woody matter. The solutions of lac thus obtained are set aside till clear and after decantation from any sediment of wax, etc., are transferred to an ordinary vacuum still, provided either with a steam jacket or a closed steam coil. There is also a perforated steam coil in the bottom of the still, and preferably also an agitator. About 90 per cent. of the alcohol is then distilled off by application of heat from the steam jacket or closed steam coil, with simultaneous application of a vacuum if desirable, the agitator being in operation meanwhile. After 90 per cent. of the alcohol has thus been removed, steam is injected by means of the perforated coil, and the remaining alcohol distilled off, also with application of vacuum and stirring if desired. The molten shellac is now drawn off from the still and formed into blocks or scales. The residue remaining in the extractor after the lac has been removed by cold alcohol, is now similarly treated with hot alcohol, or with chloroform, carbon tetrachlorid, or similar solvents, till the wax is completely extracted, the solvent being removed by distillation. The lac-dye and woody matter are finally treated with alkali to dissolve the color, the alkaline solution is filtered from the woody matter and the dye precipitated by addition of acid.

I claim:

1. A process for obtaining pure shellac from stick lac or the like, which process consists in first extracting with cold solvent, then clarifying the extract, then distilling off the larger part of the solvent from the extract and then introducing steam into the still to expel the remaining solvent, and to prevent the dehydration of the shellac.

2. A process for obtaining pure shellac from stick-lac or the like which process consists in first extracting cold alcohol as a solvent, then clarifying the extract, then distilling off the larger part of the alcohol from the extract, and then introducing steam into the still to expel the remaining alcohol and to prevent dehydration of the shellac.

In testimony whereof I have signed my name to this specification in the presence of two subscribing witnesses.

GILBERT JOHN FOWLER.

Witnesses:
JOSEPH MILLARD,
W. I. SKERTEN.